United States Patent [19]

Longa et al.

[11] Patent Number: 5,291,264
[45] Date of Patent: Mar. 1, 1994

[54] METHOD AND APPARATUS FOR THE OPTICAL MEASUREMENT OF AN ANGLE BETWEEN POSITIONS OF COMPONENTS RELATIVE TO EACH OTHER

[75] Inventor: Simone Longa, Arcisate, Marco Castelnuovo, Milano, both of Italy

[73] Assignee: Hofmann Werkstat-Technik GmbH, Pfungstadt, Fed. Rep. of Germany

[21] Appl. No.: 822,014

[22] Filed: Jan. 16, 1992

[30] Foreign Application Priority Data

Jan. 16, 1991 [IT] Italy .................... 4101047

[51] Int. Cl.⁵ .......................................... G01B 11/26
[52] U.S. Cl. .................................. 356/152; 356/141
[58] Field of Search ................ 356/140, 141, 152

[56] References Cited

U.S. PATENT DOCUMENTS

| 2,934,825 | 5/1960 | Braybrook et al. | 356/152 X |
| 3,723,744 | 3/1973 | Lim et al. | 356/152 X |
| 4,849,620 | 7/1989 | Guerin et al. | 356/152 X |

FOREIGN PATENT DOCUMENTS

| 386401 | 9/1990 | European Pat. Off. . |
| 2830257 | 1/1980 | Fed. Rep. of Germany . |
| 3632806 | 4/1987 | Fed. Rep. of Germany . |
| 3611896 | 10/1987 | Fed. Rep. of Germany . |
| 8200196 | 1/1982 | PCT Int'l Appl. . |

*Primary Examiner*—Mark Hellner
*Attorney, Agent, or Firm*—Cushman, Darby & Cushman

[57] ABSTRACT

In a method and apparatus for optically measuring an angle between the positions of components relative to each other, such as the wheels of a motor vehicle, in a vertical plane, light beams are directed along the sides of the angle to be measured. One light beam which is directed along one side of the angle is maintained in respect of its direction, while the light beam directed along the other side of the angle is deflected by the effect of the force of gravity.

27 Claims, 4 Drawing Sheets

METHOD AND APPARATUS FOR THE OPTICAL MEASUREMENT OF AN ANGLE BETWEEN POSITIONS OF COMPONENTS RELATIVE TO EACH OTHER

BACKGROUND OF THE INVENTION

The invention generally concerns procedures for the optical measurement of an angle defined by the positions of components relative to each other, for example the positions of the wheels on a motor vehicle, more particularly in a vertical plane, using light beams.

Thus for example when measuring camber angles in respect of motor vehicle wheels, the requirement involved is that of determining the angle of the central plane of the wheel, relative to the vertical plane.

SUMMARY OF THE INVENTION

An object of the present invention is to provide a method of optically measuring an angle which positions of components such as wheels on a motor vehicle have relative to each other, which can provide accurate results with a high degree of measurement resolution.

Another object of the present invention is to provide a method of optically measuring an angle between positions of components, in which the angle is ascertained in a vertical plane without the aid of external reference means such as reference points, surfaces or lines.

Still another object of the present invention is to provide an apparatus for optically measuring an angle between positions of components, for example vehicle wheels, relative to each other, which is simple in construction while affording a high level of measurement accuracy and which operates in a self-contained fashion without requiring external reference devices.

In accordance with the principles of the present invention, in a first aspect, the foregoing and other objects are achieved by a method of optically measuring an angle between positions of components, relative to each other, wherein at least one light beam is emitted along each of the first and second sides of the angle to be measured, the at least one light beam along the one side of the angle is maintained in respect of direction and the at least one light beam along the other side is deflected by the effect of the force of gravity.

Due to deflection of the one or more light beams extending along the second-mentioned leg or side of the angle to be measured, in dependence on gravitation or the effect of gravity, information in respect of the vertical direction is obtained internally in the measurement system, without the need to have recourse to the assistance of external reference markings or the like. In the angle measurement procedure, the component whose angular position relative to the vertical is to be determined is fixedly linked and related to the one or more beams which is or are emitted along the first side of the angle. In that way it is possible to determine the angular position of that component, relative to the vertical, without the assistance of external reference marks.

In a preferred feature of the invention, in the measuring procedure, the light beams are directed on to the apex of the angle to be measured and, at time intervals corresponding to that angle, are passed on for signal registration.

In order to ensure that the light beams are passed on at the appropriate times, in accordance with the angle to be measured, each light beam, apart from the respective brief transmission thereof as a light pulse for signal registration purposes, is cut out of the beam path going to the signal registration location, during the remaining period of time corresponding to the full angle, that is to say 360°, at the apex point of the angle to be measured.

In another preferred feature of the method according to the invention, first and second individual beams are directed along one or both sides of said angle, the first and second individual beams being at equal angular spacings relative to said side.

In a further aspect of the invention, the foregoing and other objects are achieved by an apparatus for the optical measurement of an angle between positions of components in a vertical plane relative to each other, comprising a first light source adapted to emit a first light beam directed along a first leg or side of the angle to be measured, on to the apex point of the angle, and a pendulum means adapted to deflect under the effect of the force of gravity in accordance with the angle to be measured. A second light source is arranged on the pendulum means and is operable to emit a second light beam which is directed towards the apex point of the angle along a second side thereof. The apparatus further includes an aperture means which, in use of the apparatus, is disposed at the apex point of the angle to be measured and which at least in the plane of said angle is adapted to pass with a narrow transmission region for the light emitted from the respective light sources, over a full angle of 360°. A light receiver is adapted to be disposed in the beam path of the light which has passed through the transmission region of the aperture means, to receive the light, while connected to the light receiver is a signal registering means for registering respective output signals produced by the light receiver. Connected to the signal registering means is a calculating means for calculating the angular spacing between the two sides of the angle, from the registration spacing in respect of the signals which are registered in the signal registering means.

It will be seen hereinafter that, by virtue of the fact that a first light beam which is coupled to the position of a component, for example a motor vehicle wheel, and which can also be referred to as the reference light beam, is emitted along the first leg or side of the angle to be measured, and the second leg or side of said angle is brought into conformity with the gravitational vector by virtue of the movement of the pendulum means, it is possible to carry out the position or angle measuring operation, without having recourse to external reference aids. The invention further makes use of the notion that the light beams which are passed along the first and second sides of the angle to be measured are detected or registered at time intervals from each other, and the angle involved is ascertained from those time intervals or the spacing in respect of time between output signals from the light receiver. The registered signals can be evaluated by means of electronic storage devices and computing means, in a computer-aided procedure, in dependence on the spacing in respect of time, for the purposes of ascertaining the magnitude of the angle to be measured.

Preferably the angle measurement procedure in accordance with the present invention may be used in relation to a wheel position measuring device, more especially for measuring the camber angle of a motor vehicle wheel. For that purpose, in accordance with a preferred configuration of the invention, the first light source is adapted to be disposed in line with the axis of the respective wheel whose camber angle is to be measured. The first light source emits a light beam along the line extending the wheel axis, forming the first side of the angle to be measured. That first light beam forms the above-mentioned reference light beam so that the first light source can also be referred to as the reference light source. The reference light beam is directed on to the aperture means which is also adapted to be disposed in line with the axis of the wheel. The aperture means performs its aperture function at the apex of the angle to be measured. The pendulum means which comprises the second light source is deflected in dependence on the camber angle which affects the angle of inclination of the axis of the wheel, about an axis which extends perpendicularly to the axis of the wheel or to the reference light beam. As a result, the time at which the second lightbeam is received is displaced in respect of time, in dependence on the camber angle of the wheel. That displacement in respect of time is assessed in an evaluation assembly, to constitute a measurement in terms of ascertaining the camber angle.

The light source which is deflected by the effect of the force of gravity may be a single light emitter device which, in opposite relationship to the direction of the gravitational vector, directs its light beam on to the aperture means which preferably rotates at a constant speed. It is also possible however for the light source which is deflected by the effect of the force of gravity to comprise first and second light emitter devices which are disposed at the same angular spacing from a pendulum arm which is disposed in the direction of the gravitational vector. The second light source may also be a reflecting surface or first and second reflecting surfaces on the pendulum means.

In a preferred feature of the apparatus of the invention the aperture means is in the form of a rotary mirror which, in specific positions, reflects the light beams towards the light receiver.

The first and second light sources may comprise light emitters which are preferably in the form of infra-red emitter diodes, although it is also possible to use laser beam sources.

Further objects, features and advantages of the present invention will be apparent from the following description of preferred embodiments.

DESCRIPTION OF PREFERRED EMBODIMENTS

Reference will now be made generally to FIGS. 1 through 4 which show embodiments of an apparatus according to the invention for the optical measurement of an angle as indicated at a, between positions of components, for example the positions of wheels on a vehicle such as a motor vehicle. It will be seen that the angle a is in a vertical plane.

The illustrated embodiments each include a first light beam source generally indicated at 3 which is operable to emit a light beam along a first leg or side S1 of the angle a to be measured. The light source 3 may be for example an infra-red emitter diode or a laser beam source.

The light beam emitted along the side S1 of the angle a forms a reference light beam.

Figure 1:
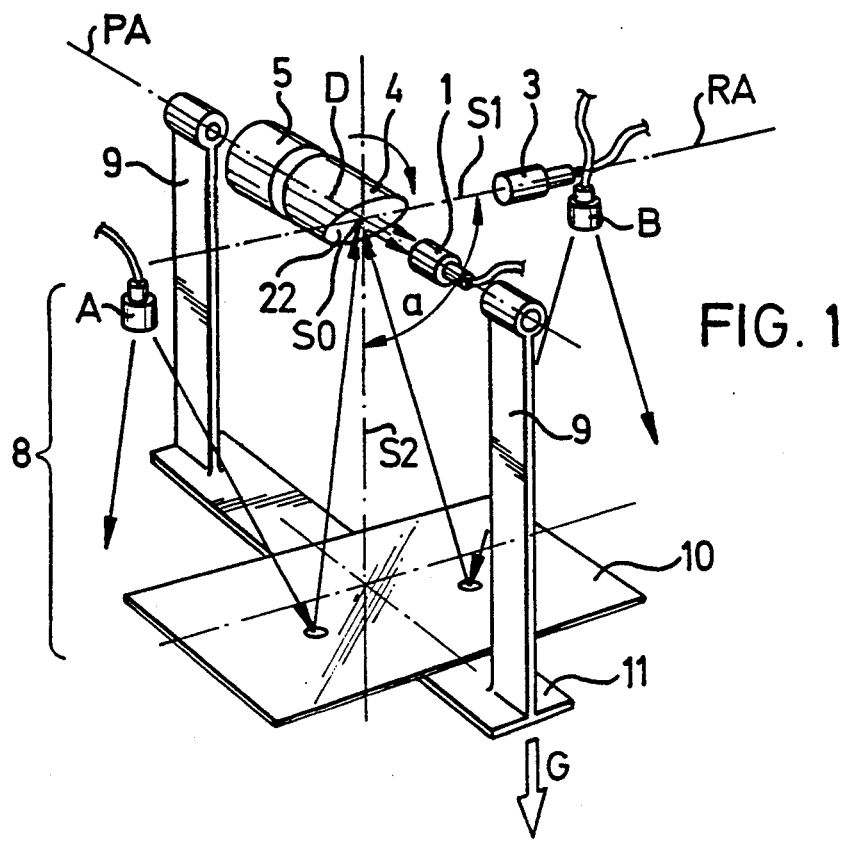
FIG. 1 is a diagrammatic perspective view of a first embodiment of the invention.
Figure 2:
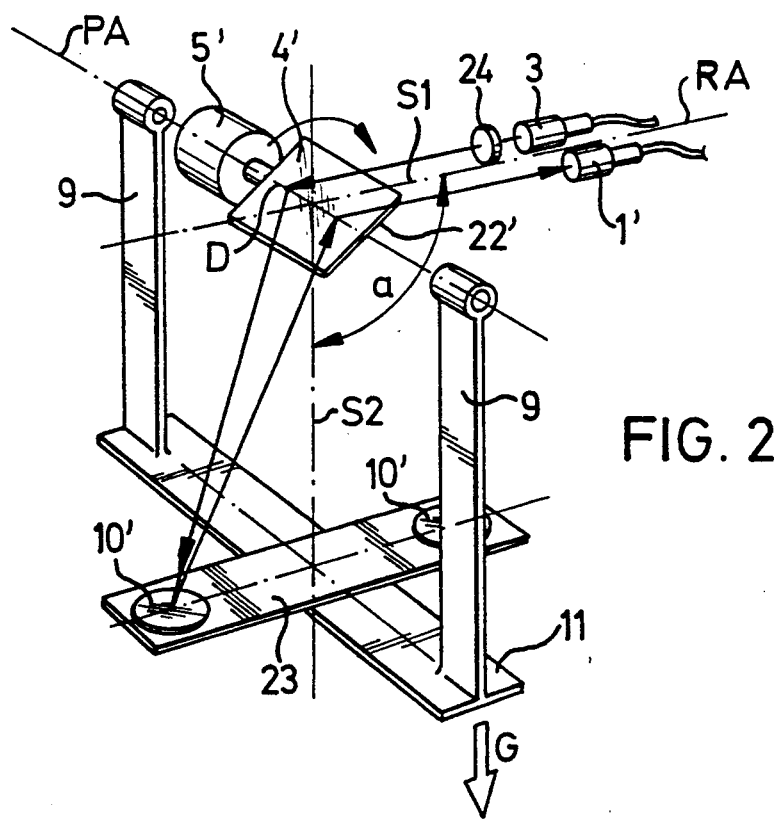
FIG. 2 is a diagrammatic perspective view of a second embodiment of the invention.
Figure 3:
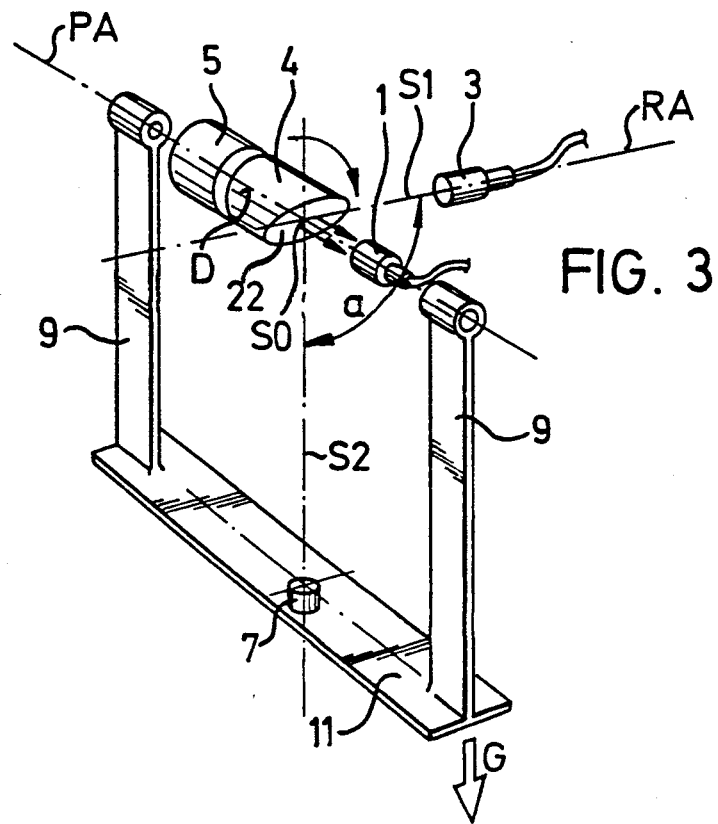
FIG. 3 is a diagrammatic perspective view of a third embodiment of the invention.
Figure 4:
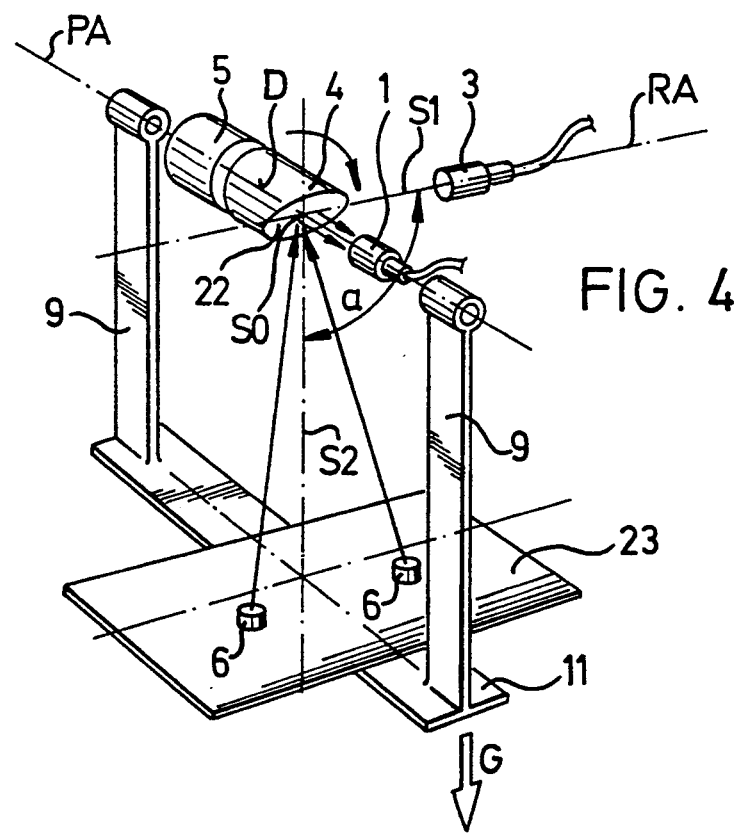
FIG. 4 is a diagrammatic perspective view of a fourth embodiment of the invention.

Disposed at the apex point indicated at S0 of the angle a is an aperture means which in the illustrated embodiments comprises a rotary mirror as indicated at 4 in FIGS. 1, 3 and 4 and as indicated at 4' in FIG. 2. The rotary mirror 4 in FIGS. 1, 3 and 4 is of a generally round or cylindrical configuration with an inclined surface constituting a reflecting surface, while the mirror 4' shown in FIG. 2 is a flat mirror. The rotary mirror 4 or 4' is driven at a constant speed of rotation or angular speed by means of a drive motor 5 which may be a dc motor or a stepping motor or the like. The apex point S0 of the angle a to be measured is on a reflecting surface 22 of the rotary mirror 4 or 22' of the rotary mirror 4'.

The rotary mirror 4, 4' or its reflecting surface 22, 22' is driven at its constant speed by the motor 5 about an axis of rotation as indicated at D in FIGS. 1, 3 and 4 and D' in FIG. 2. As indicated above, the reflecting surface 22 in FIGS. 1, 3 and 4 is arranged at an inclined angle relative to the axis of rotation D and the angle of inclination is preferably 45°. The apex point S0 of the angle a is on the axis of rotation D of the reflecting surface 22 in the embodiments shown in FIGS. 1, 3 and 4.

Thus, the reference light beam which is directed along the side S1 of the angle a, from the light source 3, is directed at a right angle relative to the axis of rotation D and meets the reflecting surface 22 at the apex point S0. The axis of rotation D extends at a right angle to the plane in which the angle a is disposed.

In the construction shown in FIG. 2, the axis of rotation D' of the rotary mirror 4' also extends at a right angle relative to the first side S1 of the angle a or the reference light beam emitted by the light source 3. Unlike the embodiments shown in FIGS. 1, 3 and 4 however, the FIG. 2 construction provides that the reflecting surface 22' of the rotary mirror 4' extends perpendicularly to the vertical plane in which the angle a to be measured is disposed. Furthermore the axis of rotation D' of the rotary mirror 4' lies at the reflecting surface 22' or extends on same. The rotary mirror 4' is also driven at a constant angular speed by the motor 5'.

Each of the embodiments shown in FIGS. 1 through 4 has a respective pendulum unit 11 at which a second light source is arranged, as generally indicated at 8 in FIG. 1. The pendulum unit 11 is deflected under the effect of the force of gravity, in the direction of a gravitational vector G. A second side S2 of the angle a to be measured extends parallel to the direction of the gravitational vector G and thus parallel to an arm 9 of the pendulum unit 11. The pendulum unit 11 is mounted pivotably on a pendulum unit axis PA by means of its pendulum arm 9; in this respect it will be appreciated that the constructions shown in FIGS. 1 through 4 have two pendulum arms 9. The pendulum axis PA extends perpendicularly to the reference side or first side S1 of the angle a. As FIGS. 1 through 4 show, the pendulum axis PA coincides with the axis of rotation D or D' of the rotary mirror 4 or 4' respectively.

In the embodiment shown in FIG. 1 the second light source 8 is represented by a reflecting surface, more especially a mirror 10, on to which are directed the beams which are emitted by first and second light emitters A and B associated with each other to constitute the second light source 8. The two light emitters A and B which may be for example infra-red light emitter diodes or laser beam sources are preferably disposed at the same spacing from the pendulum axis PA. The beams which are emitted by the first and second light emitters A and B impinge on the mirror 10 and from there are reflected towards the apex point SO of the angle a to be measured. The reflected beams are disposed at respective sides of the second limb S2 of the angle a to be measured.

In the construction shown in FIG. 2, first and second reflecting surfaces 10' are provided on the pendulum unit 11, to constitute the second light source. The center points of the reflecting surfaces 10' form with the pendulum axis PA an isosceles triangle. The reflecting surfaces 10' reflect a beam which is reflected by the reflecting surface 22' of the rotary mirror 4' and which is emitted by the reference light source 3, parallel to the first leg or side S1 of the angle a, at one side thereof. The beam which is respectively reflected by the two reflecting surfaces 10' is reflected back to the rotary mirror 4' again and reflected by the reflecting surface thereof towards a light receiver 1', in parallel relationship to the first side S1 of the angle a, on the other side thereof from the beam which was initially emitted by the reference light source 3. It will be seen therefore that the light receiver 1' is disposed beside the light source 3, on the other side of the line defining the side S1 of the angle a to be measured.

The embodiment shown in FIG. 3 has a single light emitter as indicated at 7, as the second light source. The light emitter 7 is disposed on the pendulum unit 11 and in its respective position is disposed perpendicularly beneath the apex point SO of the angle a to be measured.

In the construction shown in FIG. 4, first and second light emitters 6 are disposed on a carrier plate 22 on the pendulum unit 11. The light emitters 6 represent the second light source. The light emitters 6 emit light beams towards the apex point SO of the angle a to be measured, which is at the reflecting surface 22, as already referred to above.

Figure 6:
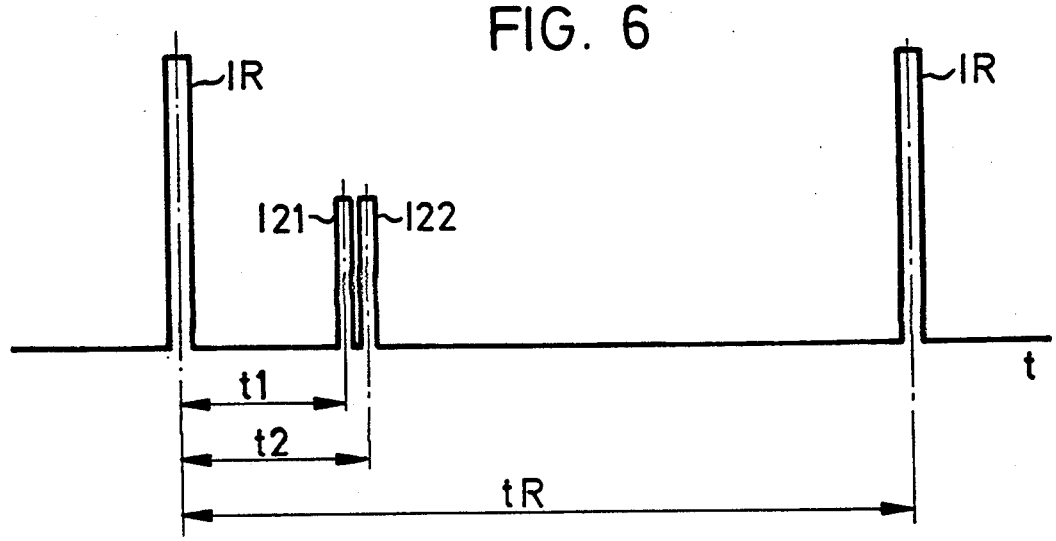
FIG. 6 shows light pulses which are received and evaluated with the FIG. 5 arrangement.

In the embodiments shown in FIGS. 1, 3 and 4, the beams from the second light sources indicated at 8 in FIG. 1, 7 in FIG. 3 and 6, 6 in FIG. 4, which are directed on to the rotary mirror 4 along the second side S2 of the angle a, are reflected on to a light receiver 1 by the reflecting surface 22. The light receiver 1 is disposed with its receiving direction in parallel or coaxial relationship with the pendulum axis PA or the axis of rotation D of the rotary mirror 4. The axes PA and D are coincident with each other.

Thus, in the FIGS. 1, 3 and 4 constructions, the reflecting surface 22 of the rotary mirror 4 continuously rotates at a constant speed through a full angle of 360°. As it does so, for the light beams which are directed along the sides S1 and S2 of the angle a, the reflecting surface 22 assumes, once for each passage through the full angle of 360°, a position in which the respective light beam is reflected towards the light receiver 1. The difference in time between reflection of the light beam along the side S1 (reference side) and reflection of the light beams along the side S2 towards the light receiver 1 depends on the magnitude of the angle a and the known speed of rotation or angular speed of the rotary mirror 4. It is therefore possible to ascertain the magnitude of the angle a, by determining that time difference.

In the embodiment shown in FIG. 2 on the other hand, the light beam which is emitted along the side S1 by the first light source 3 is possibly focussed and/or modulated by means of a lens system which is diagrammatically indicated at 24, then being directed on to the rotary mirror 4'. When, during the rotational movement of the rotary mirror 4', the reflecting surface 22' is perpendicular to the first side S1 of the angle to be measured, the light beam emitted by the first light source is reflected back along the side S1 and impinges on the light receiver 1'. During the further rotary movement of the rotary mirror 4', the reflecting surface 22' moves into a position in which it successively reflects the light beam emitted by the first light source 3, towards the first and second reflecting surfaces 10'. From there the beams are reflected back to the reflecting surface 22' and directed by the reflecting surface 22' along the first side S1 on to the light receiver 1'. Those light beams are received by the light receiver 1', in displaced relationship in respect of time, in a similar fashion to the situation which occurs with the constructions shown in FIGS. 1, 3 and 4.

Reference will now be made to FIG. 6 showing the output signal which is outputted by the respective light receiver 1 or 1', in dependence on the light pulses received thereby. In the case of the embodiments shown in FIGS. 1, 3 and 4, the beams which are directed on to the apex point SO of the angle to be measured, along the sides S1 and S2 thereof, are always reflected towards the light receiver 1 when the planes of incidence and reflection of the respective beam are perpendicular to the reflecting surface 22. It is then that the rotary mirror 4 which represents an aperture means performs its transmission function of allowing the light to be passed on, and then, as will be described in greater detail hereinafter, the light is received by the light receiver 1 in pulse form, as indicated in FIG. 6.

In the embodiment shown in FIG. 2, the light receiver 1' receives reflected beams whenever the line normal to the reflecting surface 22' forms the bisector of the respective angle between the reference side S1, or the light beam emitted parallel thereto, and the beams which are reflected by the reflecting surfaces 10'. In that case the light receiver 1' also receives respective light pulses (see FIG. 6).

Looking therefore at FIG. 6, pulses IR denote output pulses which are produced by the receiver 1 or 1' and which correspond to received light pulses associated with the light beams emitted from the reference light source 3 along the first side S1 of the angle a to be measured. The pulses IR, which as indicated above can constitute reference pulses, are produced by the light receiver 1 or 1', at given spacings in respect of time, as indicated at tR. That takes place whenever the light beam extending along the first side S1 of the angle a is reflected by the rotary mirror 4 or 4' on to the respective light receiver 1 or 1'. In the embodiments shown in FIGS. 1, 2 and 4, pulses I21 and I22 are produced at certain spacings t1 and t2 in respect of time. Those pulses I21 and I22 correspond to the light beams of the second light sources indicated at 8 in FIG. 1, 10' in FIG.

2 and 6 in FIG. 4. The difference in respect of time tR between the two reference pulses IR corresponds to a full angle of 360°. The spacings in respect of time t1 and t2 of the two output pulses I21, I22 from the reference pulse IR are parameters from which the angle a can be ascertained, in accordance with the following relationship:

$$a = \frac{(t1 + t2)/2}{tR} \times 360°$$

For the embodiment shown in FIG. 3 in which the second light source indicated at 7 emits only one light beam towards the apex point SO along the side S2, the light receiver 1 produces only one output pulse which is associated, at a time t1, with the light beam along the side S2 of the angle a. In this embodiment, the angle a is ascertained on the basis of the following relationship:

$$a = \frac{t1 \times 360°}{tR}$$

Figure 5:
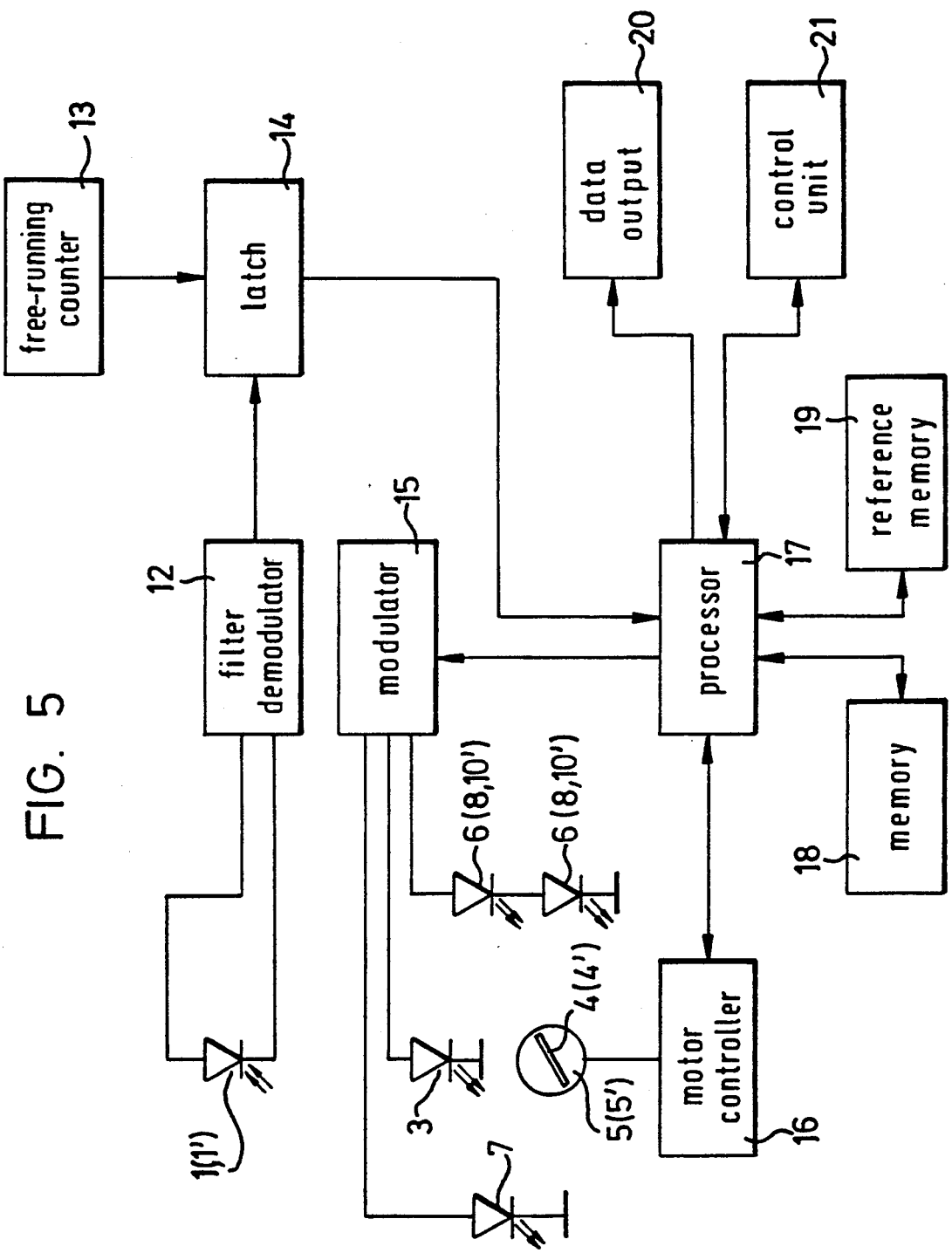
FIG. 5 is a block circuit diagram of an evaluation arrangement with which an angle to be measured is ascertained from the spacing in respect of time, of received light signals.

Reference will now be made to FIG. 5 showing an evaluation circuit for evaluation of the electrical output pulses of the light receiver 1 or 1', for ascertaining the angle to be measured. For the purposes of producing modulated light beams, the light sources 3, 6, 7 and 8, or the light omitters indicated at A and B in FIG. 1, may be modulated in suitable fashion by means of a modulator as indicated at 15. The assembly may also have suitable polarising devices such as for example the polarising device indicated at 24 in FIG. 2, which are disposed in the beam path from the light sources. It is however also possible here to provide suitable filters or the like or other lens systems. That ensures that interference radiation from the surroundings does not affect the light receiver 1 or 1'. In that case therefore a suitable demodulator as indicated at 12 in FIG. 5, for example a filter, is connected to the output of the light receiver 1 or 1'.

The circuit shown in FIG. 5 comprises a latch circuit 14 which is connected to the output of the demodulator 12 and which, at the time of a respective pulse shown in FIG. 6, latches a count value which is supplied by a free-running counter 13 and passes it on by way of a processor 17 for storage, to a memory 18. The data which are stored in the memory 18 and which correspond to the time difference tR, t1 and t2, are evaluated in the processor 17 in accordance with the above-identified equations for the respective embodiments of FIGS. 1 through 4, for calculation of the angle a. That procedure is repeated with each revolution of the rotary mirror 4 or 4'. In that respect, it will be seen that the FIG. 5 circuit includes a motor controller 16 which is connected to the processor 17 and which is operable to control the motor 5 or 5' for controlling the rotary movement of the rotary mirror 4 or 4'. As a result, the rotary mirror rotates at a constant speed of rotation. Operation of the processor 17 is controlled by a control unit 21.

Also connected to the processor 17 is a reference memory 19 which can supply the time standard for conversion of the spacing in respect of time tR into degrees of angle, the spacing tR corresponding to a full angle of 360°. However the reference memory 19 may also perform the function of storing for example mean values of previously computed angle values, so that by continuous averaging it is possible to effect angle calculation of the highest possible degree of accuracy, in a plurality of successive cycles. The angle values obtained are passed from the processor 17 to a data output 20 from which the calculated angles can be taken.

Figure 7:
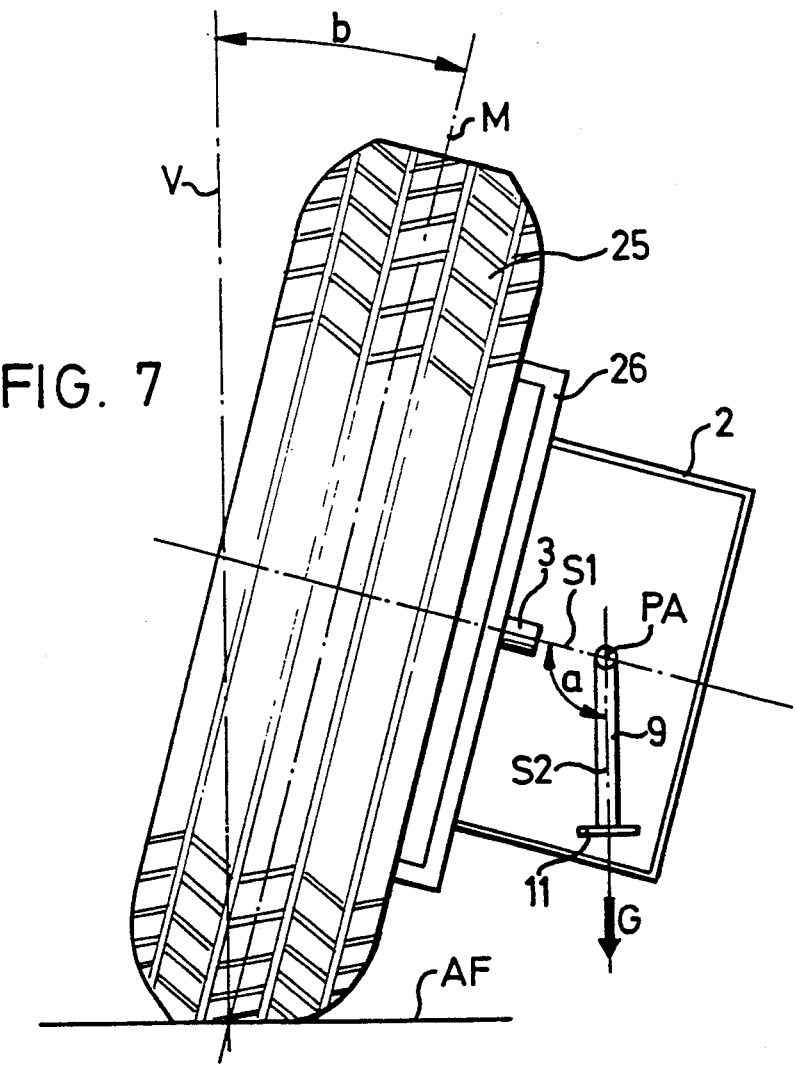
FIG. 7 shows an example of use of an apparatus as shown in any one of FIGS. 1 through 4.

Reference is now made to FIG. 7 showing an example of use of the present invention, for determining the camber angle as indicated at b of a motor vehicle wheel 25. The camber angle b is defined by the inclination of the central plane M through the wheel, relative to a vertical plane V passing through the surface AF on which the wheel 25 is supported. Measurement of the camber angle b is effected by means of a structural unit which is generally indicated at 2 and which can include the above-mentioned first and second light sources, the aperture means and the light receiver in accordance with one of the constructions shown in FIGS. 1 through 4. The structural unit 2 is secured to the vehicle wheel 25 by suitable fixing and centering means indicated at 26. The structural unit 2 is fixed in position in such a way that the first light source 3 is disposed in line with the axis RA of the wheel 25. The light beam which is emitted by the first light source 3 is therefore directed along the line of the axis RA on to the aperture means which were identified by references 4 or 4' in FIGS. 1 through 4. The pendulum axis PA extends perpendicularly to the axis RA of the wheel 25. The pendulum unit 11 is deflected in dependence on the inclined positioning of the axis RA of the wheel 25, by virtue of the effect of the force of gravity, as indicated at G. The inclination of the axis RA and therewith the deflection movement of the pendulum unit 11 depend on the camber angle b to be measured. The camber angle b can be calculated in accordance with the following equation:

$$b = a - 90°$$

from the angle a which can be ascertained in the manner described hereinbefore, by means of one of the constructions shown in FIGS. 1 through 4, by operation of the circuit shown in FIG. 5.

The evaluation operation to obtain the value of the angle b can be carried out by an additional computation operation, for example in the processor 17, using the circuit arrangement shown in FIG. 5.

It will be appreciated from the foregoing description that the method and apparatus according to the invention are simple to perform and operate, the apparatus being extremely simple in terms of its structure and being easy to operate for ascertaining the respective angle to be measured.

It will be appreciated that the above-described method and apparatus in accordance with the invention have been set forth solely by way of example and illustration thereof and that various modifications and alterations may be made therein without thereby departing from the spirit and scope of the invention.

We claim:

1. A method of optically determining an angle between positions of components relative to each other, comprising the steps of:
   emitting at least one light beam along each of first and second legs of the angle to be measured;
   maintaining the direction of said at least one beam emitted by said first leg;
   bringing said at least one beam being emitted along said second leg into conformity with the gravitational vector by moving a source of said at least one beam by the force of gravity, said light beams thereby being directed to the apex of said angle;

monitoring the light beams at time intervals; and determining said angle from said monitored light beams.

2. An apparatus for optical measurement of an angle between positions of components in a vertical plane relative to one another comprising:

a first light source for emitting a first light beam along a first leg of said angle onto the apex point of said angle;

a second light source for emitting a second light beam along a second leg of said angle onto the apex point thereof;

pendulum means for deflecting said second light source due to the force of gravity in accordance with said angle to be measured;

a reflecting in member disposed at the apex of said angle and rotatable about 360° at least in a plane of said angle, said reflecting member having a narrow transmission region for transmitting light from the first and second light sources;

a light receiver disposed in a beam path of said light passing through said transmission region;

signal registering means for registering respective output signals produced by said light receiver; and calculating means for calculating the angular spacing between said legs of said angle from registration spacing in respect to the signals registered in said signal registering means.

3. A method as set forth in claim 1, wherein, apart from the respective brief transmission thereof as a light pulse during said monitoring step, each light beam is cut out of the beam path for signal registration during a remaining period of time corresponding to a full angle of 360°, at the apex point of said angle.

4. A method as set forth in claim 1, wherein first and second individual beams are directed onto the apex point of said angle along the second leg of said angle, said first and second beams being disposed on respective sides of the said second leg and in a plane of said angle.

5. A method as set forth in claim 1, wherein the light beams which are respectively emitted along the first and second legs of said angle are deflected at a right angle to the plane in which said angle lies, prior to said monitoring step.

6. A method as set forth in claim 1, wherein the respective light beams which are emitted along the first and second legs of said angle are deflected parallel to the first leg of said angle, prior to said monitoring step.

7. A method as set forth in claim 6 wherein the light beam emitted along the second leg of said angle is produced by reflection of the light beam emitted along the first leg of said angle.

8. Apparatus as set forth in claim 2, further including means for moving said reflecting member at a constant speed through 360° in the plane of said angle to be measured.

9. Apparatus as set forth in claim 2 wherein said registration spacing is a spacing with respect to time.

10. Apparatus as set forth in claim 2 wherein said second light source at said pendulum means and comprises a pair of light source is disposed devices disposed in a plane parallel to the plane of said angle and arranged to form with the pendulum means axis an isosceles triangle.

11. Apparatus as set forth in claim 2 wherein said second light source comprises a plurality of light emitters.

12. Apparatus as set forth in claim 2 wherein a said first light source includes at least one reflector defining said second light source.

13. Apparatus as set forth in claim 2 wherein said first light source is in the form of a light emitter and is adapted to emit a light beam whose axis coincides with said first leg of said angle.

14. Apparatus as set forth in claim 10 wherein the light source devices are adapted to emit first and second light beams which are on respective sides of the second leg of said angle and which meet at the apex of said angle.

15. Apparatus as set forth in claim 2 wherein the reflecting member comprises a rotary reflecting surface on which said apex point of said angle is disposed and which is adapted to reflect the respective light beams from said light sources towards the light receiver at the angular position of the transmission region of said aperture means.

16. Apparatus as set forth in claim 15 wherein said rotating reflecting surface is at an angle of 45° relative to its axis of rotation and its axis of rotation extends at a right angle relative to the plane in which said angle to be measured is disposed.

17. Apparatus as set forth in claim 15 wherein the rotating reflecting surface is disposed at a right angle to the plane in which said angle is disposed and the axis of rotation is in the reflecting surface.

18. Apparatus as set forth in claim 15 wherein said reflecting surface is disposed on a rotary mirror.

19. Apparatus as set forth in claim 15 wherein the pendulum means axis and the axis of rotation of the rotary reflecting surface are coaxial.

20. Apparatus as set forth in claim 19 wherein the pendulum means axis and the axis of rotation of the rotary reflecting surface are disposed in a horizontal plane.

21. Apparatus as set forth in claim 15 wherein the light receiver is disposed at the axis of rotation of the rotary reflecting surface.

22. Apparatus as set forth in claim 2 wherein the light receiver is oriented in its receiving direction at least substantially parallel to the first leg of said angle.

23. Apparatus as set forth in claim 2 including an evaluation means connected to the light receiver and operable for determining said angle from the registration spacings in respect of a time in which the light beams are received.

24. Apparatus as set forth in claim 2 wherein the first light source, the second light source, the reflecting means and the light receiver form a structural unit which is adapted to be mounted to a component.

25. Apparatus as set forth in claim 2 utilized for measuring wheel positions on a vehicle whereby said first light source is adapted to be disposed in line with the respective wheel axis for emission of the first light beam along a line extending said wheel axis which forms said first leg of the angle to be measured in a vertical plane; and the reflecting member is adapted to be disposed in line with the respective wheel axis.

26. Apparatus as set forth in claim 25 wherein the pendulum means axis and the wheel axis are disposed perpendicularly to each other.

27. Apparatus as set forth in claim 25 wherein the camber angle of the wheel is determined from the measured angle.

* * * * *

UNITED STATES PATENT AND TRADEMARK OFFICE
CERTIFICATE OF CORRECTION

PATENT NO. : 5,291,264
DATED : March 1, 1994
INVENTOR(S) : Simone Longa et al

It is certified that error appears in the above-indentified patent and that said Letters Patent is hereby corrected as shown below:

On the title page, Item [30]: change the priority country from "Italy" to --Fed Rep. of Germany--.

Signed and Sealed this

Second Day of August, 1994

Attest:

BRUCE LEHMAN

*Attesting Officer*     *Commissioner of Patents and Trademarks*